United States Patent
Vilsmeier et al.

(10) Patent No.: US 12,475,730 B2
(45) Date of Patent: Nov. 18, 2025

(54) DETERMINING IMAGE SIMILARITY BY ANALYSING REGISTRATIONS

(71) Applicant: Brainlab AG, Munich (DE)

(72) Inventors: Stefan Vilsmeier, Munich (DE); Jens Schmaler, Mering (DE)

(73) Assignee: BRAINLAB AG, Munich (DE)

( * ) Notice: Subject to any disclaimer, the term of this patent is extended or adjusted under 35 U.S.C. 154(b) by 290 days.

(21) Appl. No.: 17/801,464

(22) PCT Filed: Mar. 26, 2021

(86) PCT No.: PCT/EP2021/057994
§ 371 (c)(1),
(2) Date: Aug. 22, 2022

(87) PCT Pub. No.: WO2021/191438
PCT Pub. Date: Sep. 30, 2021

(65) Prior Publication Data
US 2023/0087494 A1    Mar. 23, 2023

(30) Foreign Application Priority Data
Mar. 26, 2020 (WO) ................ PCT/EP2020/058577

(51) Int. Cl.
*G06V 40/10* (2022.01)
*G06T 7/33* (2017.01)
(Continued)

(52) U.S. Cl.
CPC ............. *G06V 40/10* (2022.01); *G06T 7/337* (2017.01); *G06T 7/344* (2017.01); *G06V 10/761* (2022.01);
(Continued)

(58) Field of Classification Search
CPC .... G06V 40/10; G06V 10/761; G06V 10/774; G06V 10/82; G06V 2201/03;
(Continued)

(56) References Cited

U.S. PATENT DOCUMENTS

| | | | |
|---|---|---|---|
| 2013/0251099 A1* | 9/2013 | Kunz | A61B 5/0036 378/65 |
| 2017/0177827 A1* | 6/2017 | Achatz | A61N 1/37235 |

(Continued)

FOREIGN PATENT DOCUMENTS

| | | |
|---|---|---|
| WO | 2021121586 | 6/2021 |
| WO | 2021191438 | 9/2021 |

OTHER PUBLICATIONS

European Patent Office, International Search Report and Written Opinion for PCT Application PCT/EP2021/191438 dated Jul. 21, 2021, 22 pages.

*Primary Examiner* — Huy C Ho
(74) *Attorney, Agent, or Firm* — Gray Ice Higdon

(57) ABSTRACT

Disclosed are computer-implemented methods which encompass determining whether two medical images were taken of the same patient. In a first aspect, this is done by analysing a registration of the two images with one another. The registration may be a direct registration between the two images or an indirect registration, for example via an atlas to which each image is registered. In other aspects, a machine learning algorithm is trained on the basis of image registrations to determine whether the two images were taken of the same patient. The disclosed methods serve the purpose of being able to group medical images together which were taken of the same patient without having to provide or otherwise process data about the identity of the patient.

10 Claims, 5 Drawing Sheets

(51) Int. Cl.
  *G06V 10/74*   (2022.01)
  *G06V 10/774*  (2022.01)
  *G06V 10/82*   (2022.01)
  *G16H 10/60*   (2018.01)
  *G16H 30/20*   (2018.01)

(52) U.S. Cl.
  CPC ............ G06V 10/774 (2022.01); G06V 10/82 (2022.01); G16H 10/60 (2018.01); G16H 30/20 (2018.01); *G06T 2207/20081* (2013.01); *G06T 2207/20084* (2013.01); *G06V 2201/03* (2022.01)

(58) Field of Classification Search
  CPC ............... G06T 7/337; G06T 7/344; G06T 2207/20081; G06T 2207/20084; G16H 10/60; G16H 30/20; G06F 18/24137
  USPC ........................................... 382/159
  See application file for complete search history.

(56) References Cited

U.S. PATENT DOCUMENTS

2018/0005378 A1    1/2018   Varkuti et al.
2018/0300540 A1   10/2018   Swisher et al.

\* cited by examiner

DETERMINING IMAGE SIMILARITY BY ANALYSING REGISTRATIONS

FIELD OF THE INVENTION

The present invention relates to computer-implemented methods of determining whether a plurality of medical images were taken of the same patient and of training a learning algorithm to determine whether a plurality of medical images were taken of the same patient, corresponding computer programs, a computer-readable storage medium storing such a program and a computer executing the program, as well as a system comprising an electronic data storage device and the aforementioned computer.

TECHNICAL BACKGROUND

A frequently faced problem in comparing sets of medical image data taken of the same patient with one another is that the image contents of the sets to be compared may not be comparable, for example not entirely comparable, for example due to deviations between the data sets which are due to a change in imaging conditions or anatomy. It is known to compare image features with one another which are characteristic for the individual patient and present in the data sets to be compared to determine for example whether the data sets were derived from the same patient. This, however, may lead to wrong results because a change in imaging conditions or anatomy may lead to the result that the data sets were taken of different patients when such a method of comparing is applied, whereas just the contrary would be true.

An object of the present invention may therefore be defined for example as to provide a more reliable method of comparing medical images which for example takes into account a change of imaging conditions or anatomy in between the points in time at which the data sets to be compared were generated.

US 2013/0251099 A1 discloses a method of verifying patient identity in which an image of an individual who is to receive radiotherapy is obtained and compared with a reference image of a patient to whom the radiotherapy is intended. Confirmation on negation of the individual to be the patient intended can be made based on the comparison of the image of the individual with the reference image of the patient by considering a threshold for defining the similarity resulting from the comparison.

US 2018/0300540 A1 discloses techniques for identifying individuals in digital images. A digital image or a plurality of digital images that captures a scene containing one or more people. The single digital image may be applied as input across a single machine learning model. In some implementations, the single machine learning model may be trained to perform a non-facial feature recognition task and a face-related recognition task. Output may be generated over the single machine learning model based on the input. The output may include first data indicative of non-facial features of a given person of the one or more people and second data indicative of at least a location of a face of the given person in the digital image relative to the non-facial features. In various embodiments, the given person may be identified based at least in part on the output.

Aspects of the present invention, examples and exemplary steps and their embodiments are disclosed in the following. Different exemplary features of the invention can be combined in accordance with the invention wherever technically expedient and feasible.

EXEMPLARY SHORT DESCRIPTION OF THE INVENTION

In the following, a short description of the specific features of the present invention is given which shall not be understood to limit the invention only to the features or a combination of the features described in this section.

The disclosed methods encompass determining whether two medical images were taken of the same patient. In a first aspect, this is done by analysing a registration of the two images with one another. The registration may be a direct registration between the two images or an indirect registration, for example via an atlas to which each image is registered. In other aspects, a machine learning algorithm is trained on the basis of image registrations to determine whether the two images were taken of the same patient. The disclosed methods serve the purpose of being able to group medical images together which were taken of the same patient without having to provide or otherwise process data about the identity of the patient.

GENERAL DESCRIPTION OF THE INVENTION

In this section, a description of the general features of the present invention is given for example by referring to possible embodiments of the invention.

In general, the invention reaches the aforementioned object by providing, in a first aspect, a computer-implemented method (for example, medical method) of determining whether a plurality of, for example two or exactly two, medical images were taken of the same patient. The method according to the first aspect comprises executing, on at least one processor of at least one computer, the following exemplary steps which are executed by the at least one processor.

In a (for example first) exemplary step of the method according to the first aspect, first patient image data is acquired which describes a first medical image of a first anatomical body part of a first patient.

In a (for example second) exemplary step of the method according to the first aspect, second patient image data is acquired which describes a second medical image of a second anatomical body part of a second patient corresponding to the first anatomical body part. For example, the first anatomical body part and the second anatomical body part are identical concerning their anatomical function. Alternatively, the first anatomical body part and the second anatomical body part are different, for example adjacent, parts of a larger anatomical structure comprising both the first anatomical body part and the second anatomical body part.

The first patient image data and the second patient image data have been generated by applying, to the first anatomical body part and the second anatomical body part, respectively, an imaging modality such as a tomographic imaging modality, for example magnetic resonance imaging or computed x-ray tomography or ultrasound tomography, or a non-tomographic imaging modality such as radiography. The first patient image data and the second patient image data may therefore be three-dimensional or two-dimensional image data, depending on the applied imaging modality. The first patient image data and the second patient image data has been generated using the same imaging modality or different imaging modalities.

In a (for example third) exemplary step of the method according to the first aspect, registration data is determined based on the first patient image data and the second patient image data, wherein the registration data describes a registration between the first medical image and the second medical image. In the context of this disclosure, a registration is a positional relation between images, for example between image constituents. A registration is embodied for example by a transformation such as a transformation matrix, specifically an elastic transformation or elastic deformation. A registration defines for example positional transformation between the positional reference systems used for defining positions in the images and/or between the positions of certain image constituents in the images. The registration in one example is a direct registration between the first medical image and the second medical image. In another example, the registration is an indirect registration which can be defined as a concatenation of a plurality of, for example or exactly two registrations. For example, both the first medical image and the second medical image are registered to an atlas defined by atlas data (as described below with reference to an example of the method according to the first aspect), and the registration between the first medical image and the second medical image is then defined as a concatenation (for example, multiplying, adding or convolving) of the registration between the first medical image and the atlas and the inverse of the registration between the second medical image and the atlas.

In a (for example fourth) exemplary step of the method according to the first aspect, patient image comparison data is determined based on the registration data, wherein the patient image comparison data describes a measure of similarity between the first medical image and the second medical image. For example, the measure of similarity is defined as or deduced from the registration or, if the registration is defined as a concatenation of two or more registrations, is defined as for example the similarity of the registrations.

In a (for example fifth) exemplary step, similarity threshold data is acquired which describes a threshold for the measure of similarity. The threshold can be defined as a single numeric value or as a plurality of numeric values, for example if the measure of similarity is defined as a matrix, a plurality of numeric values in a matrix of same dimensionality.

In a (for example sixth) exemplary step of the method according to the first aspect, patient similarity data is determined based on the patient image comparison data, wherein the patient similarity data describes that the first medical image and the second medical image were taken of the same patient if the measure of similarity attains a predetermined relationship relative to (for example, exceeds or falls below) the threshold.

Using the registration as a means for comparing the first medical image and the second medical image is associated with the technical effect of leading to a correct result of the comparison also in the case of a deviation on the one hand in imaging conditions using the registration for different imaging conditions and/or different imaging modalities, or on the other hand anatomy for any anatomical state present in the images using a model, for example a biomechanical model which is described below, which describes the possible anatomical variations within a single patient for example over time between the images to be compared. For example, the registration is determined for the anatomical deviation which is most similar to an anatomical deviation which can be reproduced using the model.

In a (for example seventh) exemplary step, atlas data is acquired which describes an image-based model of the first and second anatomical body parts. For example, determining the registration data then includes determining first registration data based on the first patient image data and the atlas data, the first registration data describing a first registration between the first medical image and the image-based model, and determining second registration data based on the second patient image data and the atlas data, wherein the second registration data describes a second registration between the second medical image and the image-based model. Determining the patient image comparison data then includes determining registration comparison data based on the first registration data and the second registration data, wherein the registration comparison data describes a measure of similarity between the first registration and the second registration. The patient image comparison data is then determined further based on the registration comparison data. In this example, the registration between the first medical image and the second medical image is defined or can be seen or interpreted as a concatenation of the first registration and the inverse of the second registration.

In an example of the method according to the first aspect, determining the registration comparison data comprises acquiring adaptability model data which describes an adaptability model of the first and second anatomical body part. For example, the adaptability model is a finite element model or a coupled spring model of the first and second anatomical body part. The adaptability in an example describes a deformability of the first and second anatomical body part. The adaptability is defined as for example the degrees of freedom for changing the boundary conditions of the finite element model or coupled spring model, respectively, for example by moving nodes, changing or adding or removing mass points, or changing or adding or removing forces. For example, the adaptability model contains statistical information about the value range in which the degrees of freedom may vary due to changes of the anatomy over time, for example as an effect of body motion or natural growth, shrinking, wear, disease, swelling, or physiological cyclic changes, state depending on hydration. The comparison of the difference between the first and the second image to the degrees of freedom of the adaptability model can be used to deduce whether the model can reproduce the respective anatomical situations to determine whether the difference between the images is due to anatomical or external factors (e.g. due to breathing motion or due to resection of a tumour). For example, determining the registration comparison data then comprises determining registration difference data describing a difference between the first registration and the second registration. For example, the difference is determined by determining the inverse of the second registration and concatenating it with the first registration. For example, the first registration and the second registration are each defined as a field of displacement vectors and the difference between the result of the concatenation and an adaptability transformation results in a field of displacement vectors. In a specific example, that field of displacement vectors comprises no displacement vector that is longer than a predetermined value. The adaptability transformation describes a configuration, for example an anatomical or physiological variation, of the adaptability model. For example, the configuration is defined by the spatial, for example geometry, of the adaptability model.

In an example of the method according to the first aspect, determining the registration comparison data comprises determining registration difference data describing a difference between the first registration and the second registration. For example, the difference is determined by determining the inverse of the second registration and concatenating it with the first registration, wherein the first registration and the second registration are each defined as a field of displacement vectors. For example, the concatenation results in a field of displacement vectors comprising no displacement vector that is longer than a predetermined value.

In an example of the method according to the first aspect, determining the registration comparison data comprises determining registration difference data describing a difference between the first registration and the second registration. For example, the first registration and the second registration are each defined as a field of displacement vectors. For example, the difference between the first registration and the second registration is determined by determining the inverse of the second registration and concatenating it with the first registration and subtracting from the concatenation a rigid transformation. For example, the rigid transformation describes a rotation and/or a translation, for example of at least part of the first medical image relative to at least part of the second medical image. For example, a rigid transformation substantially describes only a rotation and transformation and no elastic deformation.

In an example of the method according to the first aspect, the first anatomical body part is an anatomically invariant or anatomically adaptable anatomical body part. An anatomically adaptable part of an anatomical body part is in the framework of this disclosure understood to be a part which can change its shape within the patient's body (such as soft tissue). An anatomically invariant part of an anatomical body part is in the framework of this disclosure understood to be a part which can substantially not change its shape, i.e. is rigid (such as bony tissue or cartilage). However, both an anatomically invariant and an anatomically adaptable part can change their position, for example relative to other parts of the patient's body (for example, by moving an arm or due to breathing motion).

In a second aspect, the invention is directed to a computer-implemented method (for example, medical method) of training a learning algorithm to determine whether a plurality of, for example two or exactly two, medical images were taken of the same patient. The method according to the second aspect comprises executing, on at least one processor of at least one computer (for example at least one computer being part of a cloud-based data processing system), the following exemplary steps which are executed by the at least one processor.

In a (for example first) exemplary step of the method according to the second aspect, training patient image data is acquired which describes a plurality of medical patient training images showing the anatomical body part. The training patient image data has been generated by applying, to the anatomical body part, an imaging modality such as a tomographic imaging modality, for example magnetic resonance imaging or computed x-ray tomography or ultrasound tomography, or a non-tomographic imaging modality such as radiography. The training patient image data may therefore be three-dimensional or two-dimensional image data, depending on the applied imaging modality. For example, a plurality of the medical patient training images, but not necessarily all of them, have been taken of the same patient.

In a (for example second) exemplary step of the method according to the second aspect, patient identifier data is acquired which describes, for each of the medical patient training images, a patient identifier identifying the patient of whom the respective medical patient image was taken.

In a (for example third) exemplary step of the method according to the second aspect, training registration data is determined based on the training patient image data, wherein the training registration data describes registrations between pairs of images from the plurality of medical patient training images, i.e. each registration is established between two or exactly two of the medical patient training images. For example, the registrations are established directly between the plurality of medical patient training images.

In a (for example fourth) exemplary step of the method according to the second aspect, patient association data is determined for images belonging to the plurality of medical training images, for example for each of the pairs of the medical training images, wherein the patient association data is determined based on the training patient image data and the patient identifier data and comprises patient association information which describes whether the images belonging to each of the pairs of the medical images were taken of the same patient. The patient association information can be human-readable and/or machine-readable. Essentially, an association of each training image with a specific patient defined by the patient identifier data is used as a proxy for later on training a learning algorithm to determine whether for example two images were taken of the same patient.

In a (for example fifth) exemplary step of the method according to the second aspect, image similarity data is determined which describes model parameters of a learning algorithm for establishing a relation between the registrations and the patient association information, wherein the image similarity data is determined by inputting the training registration data and the patient association data into a function which establishes the relation. Thereby, the learning algorithm is trained to learn the aforementioned relation, for example association between registrations and images taken of the same patient (or not the same patient).

In an example of the method according to the second aspect, atlas data is acquired which describes an image-based model of the first and second anatomical body parts. Furthermore, first registration data is determined based on a first image of each of the pairs of medical patient training images, the first registration data describing a first registration between the first image and the image-based model, and second registration data is determined based on a second image of each of the pairs of medical patient training images, the second registration data describing a second registration between the second image and the image-based model. The learning algorithm is then trained to determine a statement indicating whether the first image and the second image have been taken of the same patient based on the first registration data and the second registration data, wherein the statement can be associated with a certain level of confidence. In this example, the registration between the first image and the second image of each pair is defined as a concatenation of the first registration and the inverse of the second registration.

In an example of the method according to the second aspect, the anatomical body part is anatomically invariant or anatomically adaptable, and registration analysis data is determined for each of the first registration and the second registration separately based on the registration data, wherein the registration analysis data describes a statistical value characterising a set of registration vectors for at least one anatomically invariant or anatomically adaptable part of the first and second anatomical body parts. The learning algorithm is then trained to determine a statement indicating whether the first image and the second image have been taken of the same patient based on the first registration data and the second registration data, wherein the statement can be associated with a certain level of confidence.

In an example of the method according to the second aspect, atlas data is acquired which describes an image-based model of the first and second anatomical body parts. Furthermore, first registration data is determined based on a first image of each of pairs of medical patient training images, the first registration data describing a first registration between the first image and the image-based model, and second registration data is determined based on a second image of each of pairs of medical patient training images, the second registration data describing a second registration between the second image and the image-based model. The learning algorithm is then trained to determine a statement indicating whether the first image and the second image have been taken of the same patient based on the first registration data and the second registration data, wherein the statement can be associated with a certain level of confidence. In a variation of this example, the learning algorithm is trained to determine that the first image and the second image have been taken of the same patient if the multiplication results in at least substantially unity.

In a third aspect, the invention is directed to a computer-implemented method (for example, medical method) of determining whether a plurality of, for example two or exactly two, medical images were taken of the same patient. The method according to the second aspect comprises executing, on at least one processor of at least one computer (for example at least one computer being part of a cloud-based data processing system), the following exemplary steps which are executed by the at least one processor.

In a (for example first) exemplary step of the method according to the third aspect, specific registration data is acquired which describes a specific registration between a plurality of medical images of an anatomical body part. Each registration is defined between two or exactly two of the medical images.

In a (for example second) exemplary step of the method according to the third aspect, specific image similarity data is determined which describes a relation between patient association data which describes whether images belonging to the plurality of, for example each pair between which the associated registration is defined, medical images were taken of the same patient and the specific registration data. The specific image similarity data is determined by inputting the specific registration data into a function which establishes the relation, the function being part of a learning algorithm which has been trained by executing the method according to the second aspect. This allows grouping images into sets of images which have been taken for the same patient, depending on the determined similarity between the images. Using the registration as a means for correctly grouping the medical images is associated with the technical effect of leading to a correct result of the grouping also in the case of a deviation in imaging conditions or anatomy between the images to be grouped together.

For example, the learning algorithm used in the methods according to the second and third aspects comprises or consists of a machine learning algorithm. For example, the learning algorithm comprises or consists of a convolutional neural network. For example, the model parameters define the learnable parameters, for example weights, of the learning algorithm used in the methods according to the second and third aspects.

In one example of the methods according to the first, second and third aspects, the learning algorithm may be a random forest algorithm. According to Antonio Criminisi, Jamie Shotton, Ender Konukoglu: "Decision Forests: A Unified Framework for Classification, Regression, Density Estimation, Manifold Learning and Semi-Supervised Learning" (2011), https://www.microsoft.com/en-us/research/wp-content/uploads/2016/02/Crim inisiForests_FoundTrends_2011.pdf, random forests can be explained as follows:

Random forests or are an ensemble learning method for classification or regression that operates by constructing a multitude of decision trees at training time and outputting the class that is the mode of the classes (classification) or mean prediction (regression) of the individual trees.

The basic building block of a random forest is a single decision tree. A decision tree is a set of questions organized in a hierarchical manner and represented graphically as a tree. A decision tree estimates an unknown property (the "label") of an object by asking successive questions about its known properties (the so-called "features").

Which question to ask next depends on the answer of the previous question and this relationship is represented graphically as a path through the tree which the object follows. The decision is then made based on the terminal node on the path (the so-called "leaf-node"). Each question corresponds to an internal node (so-called "split-node") of the tree.

Each split node has associated to it a so-called test function. We formulate a test function at a split node j as a function with binary outputs $$h(v,\theta_j): \mathcal{F} \times \mathcal{T} \rightarrow \{0,1\}$$

where 0 and 1 can be interpreted as "false" and "true" respectively, $\theta_j \in \mathcal{T}$ denotes the parameters of the test function at the j-th split node.

v thereby is the current object ("data point") denoted by a vector $v=(x_1, x_2, \ldots, x_d) \in \mathcal{F}$, where the components $x_i$ represent some attributes of the data point (the features), all of which form the Feature space $\mathcal{F}$.

In the simplest form, the test function is a linear model which selects one feature axis in the feature space and classifies each data point according to whether the value of the respective feature is below or above a learnable threshold. Other more complex, non-linear test functions are possible.

In order to train a decision tree, we use a set of training data points for which both the features as well as the desired label are known. The goal of the training is to automatically learn suitable test functions at all the split-nodes which are best suited to determine the label from the features of a data point. Later on, such a trained decision tree can then be evaluated for a new data point with unknown label by sending the data point through the trained tree based on its features.

For understanding the training procedure, it is useful to denote subsets of training points as being associated with different tree branches. For instance $S_1$ denotes the subset of training points reaching node 1 (nodes are numbered in breadth-first order starting from 0 for the root F, and $S_1^L$, $S_1^R$ denote the subsets going to the left and to the right children of node 1, respectively.

The training takes care of selecting the type and parameters of the test function $h(v, \theta_j)$ associated with each split node (indexed by j) by optimizing a chosen objective function defined on an available training set.

The optimization of the split functions proceeds in a greedy manner. At each node j, depending on the subset of the incoming training set $S_j$ we learn the function that "best" splits $S_j$ into $S_j^R$ and $S_j^L$. This problem is formulated as the maximization of an objective function at that node $$\Theta_j^* = \arg\max_{\theta_j \in \mathcal{T}} I_j$$

with $$I_j = I(S_j, S_j^L, S_j^R, \theta_j)$$

$$S_j^L = \{(v,y) \in S_j | h(v, \theta_j) = 0\}$$

$$S_j^R = \{(v,y) \in S_j | h(v, \theta_j) = 1\}$$

As before, the symbols $S_j$, $S_j^L$, $S_j^R$ denote the sets of training points before and after the spit. The objective function is of an abstract form here. Its precise definition and the meaning of "best" depends on the task at hand (e.g., supervised or not, continuous or discrete output). For instance, for binary classification, the term "best" can be defined as splitting the training subset $S_j$ such that the resulting child nodes are as pure as possible, that is, containing only training points of a single class. In this case the objective function can, for instance, be defined as the information gain.

During training we also need to optimize the tree structure (shape). Training starts at the root node, j=0, where the optimum split parameters are found as described earlier. Thus, we construct two child nodes, each receiving a different disjoint subset of the training set. This procedure is then applied to all the newly constructed nodes and the training phase continues. The structure of the tree depends on how and when we decide to stop growing various branches of the tree. Diverse stopping criteria can be applied. For example, it is common to stop the tree when a maximum number of levels D has been reached. Alternatively, one can impose a minimum value of the maximum $\max_{\theta_j} I_j$, in other words we stop when the sought for attributes of the training points within the leaf nodes are similar to one another. Tree growing may also be stopped when a node contains too few training points. Avoiding growing full trees has been demonstrated to have positive effects in terms of generalization.

During training, randomness is injected into the trees: Instead of optimizing over the whole parameter space of the test functions, when training at the j-th node we only make available a small random subset $\mathcal{T}_j \in \mathcal{T}$ of parameter values. Thus, under the randomness model training a tree is achieved by optimizing each split node j by $$\Theta_j^* = \arg\max_{\theta_j \in \mathcal{T}_j} I_j.$$

Due to this randomized setup, multiple decision trees can later be trained in parallel, each exploiting a different set of properties from a data point.

At the end of the training phase we obtain: (i) the (greedily) optimum weak learners associated with each node, (ii) a learned tree structure, and (iii) a different set of training points at each leaf.

After training, each leaf node remains associated with a subset of (labelled) training data. During testing, a previously unseen point traverses the tree until it reaches a leaf. Since the split nodes act on features, the input test point is likely to end up in a leaf associated with training points which are all similar to itself. Thus, it is reasonable to assume that the associated label must also be similar to that of the training points in that leaf. This justifies using the label statistics gathered in that leaf to predict the label associated with the input test point.

In the most general sense the leaf statistics can be captured using the posterior distributions $p(c|v)$ and $p(y|v)$, where c and y represent the discrete or continuous labels, respectively. v is the data point that is tested in the tree and the conditioning denotes the fact that the distributions depend on the specific leaf node reached by the test point. Different leaf predictors can be used. For instance, a Maximum A-Posteriori (MAP) estimate may be obtained as $c^* = \arg\max_c p(c|v)$, in the discrete case.

Based on the above construction principle for decision trees, we can now proceed to decision forests, also called random forests:

A random decision forest is an ensemble of randomly trained decisions trees. The key aspect of the forest model is the fact that its component trees are all randomly different from one another. This leads to decorrelation between the individual tree predictions and, in turn, results in improved generalization and robustness.

In a forest with T trees we use the variable $t \in \{1, \ldots, T\}$ to index each component tree. All trees are trained independently (and possibly in parallel). During testing, each test point v is simultaneously pushed through all trees (starting at the root) until it reaches the corresponding leaves. Tree testing can also often be done in parallel, thus achieving high computational efficiency on modern parallel CPU or GPU hardware. Combining all tree predictions into a single forest prediction may be done by a simple averaging operation. For instance, in classification $$p(c|v) = \frac{1}{T}\sum_{t=1}^{T} p_t(c|v),$$

where $p_t(c|v)$ denotes the posterior distribution obtained by the t-th tree. Alternatively, one could also multiply the tree outputs together (though the trees are not statistically independent)

$$p(c|v) = \frac{1}{Z}\prod_{t=1}^{T} P_t(c|v)$$

with the partition function Z ensuring probabilistic normalization."

In one example of the methods according to the first, second and third aspects, the learning algorithm may be a convolutional neural network. In the following, an explanation of convolutional neural networks as an example of the machine learning algorithm to be used with the disclosed invention is provided with reference to FIG. 1.

Convolutional networks, also known as convolutional neural networks, or CNNs, are an example of neural networks for processing data that has a known grid-like topology. Examples include time-series data, which can be thought of as a 1-D grid taking samples at regular time intervals, and image data, which can be thought of as a 2-D or 3-D grid of pixels. The name "convolutional neural network" indicates that the network employs the mathematical operation of convolution. Convolution is a linear operation. Convolutional networks are simply neural networks that use convolution in place of general matrix multiplication in at least one of their layers. There are several variants on the convolution function that are widely used in practice for neural networks. In general, the operation used in a convolutional neural network does not correspond precisely to the definition of convolution as used in other fields, such as engineering or pure mathematics.

The main component of convolutional neural networks are artificial neurons. FIG. 1 is an example of a single neuron depicted. The node in the middle represents a neuron, which takes all inputs ($x_1, \ldots, x_n$) and multiplies them with their specific weights ($w_1, \ldots, w_n$) The importance of the input depends on the value of its weight. The addition of these computed values is called weighted sum which will be inserted into an activation function. The weighted sum z is defined as:

$$z = \Sigma_{i=0}^{n} x_i \cdot w_i \qquad (1)$$

The bias b is an input-independent value which modifies the boundaries of the threshold. The resulting value is processed by an activation function which decides whether the input will be transferred to the next neuron.

A CNN usually takes an order 1 or 3 tensor as its input, e.g., an image with H rows, W columns, and 1 or 3 channels (R, G, B colour channels). Higher order tensor inputs, however, can be handled by CNN in a similar fashion. The input then sequentially goes through a series of processing. One processing step is usually called a layer, which could be a convolution layer, a pooling layer, a normalization layer, a fully connected layer, a loss layer, etc. Details of the layers are described in the sections below.

$$x^1 \to \boxed{} \to x^2 \to \ldots \to x^{L-1} \to \boxed{} \to x^L \to \boxed{} \to z \qquad (1)$$

The above equation 5 illustrates how a CNN runs layer by layer in a forward pass. The input is $x^1$, usually an image (order 1 or 3 tensor). We note the parameters involved in the processing of the first layer collectively as a tensor $w^i$. The output of the first layer is $x^2$, which also acts as the input to the second layer processing. This processing proceeds until processing of all layers in the CNN has been finished, which outputs $x^L$. One additional layer, however, is added for backward error propagation, a method that learns good parameter values in the CNN. Suppose the problem at hand is an image classification problem with C classes. A commonly used strategy is to output $x^L$ as a C-dimensional vector, the i-th entry of which encodes the prediction (posterior probability that $x^1$ comes from the i-th class). To make $x^L$ a probability mass function, we can set the processing in the (L−1)-th layer as a softmax transformation of $x^{L-1}$. In other applications, the output $x_L$ may have other forms and interpretations. The last layer is a loss layer. Let us suppose t is the corresponding target (ground-truth) value for the input $x^1$, then a cost or loss function can be used to measure the discrepancy between the CNN prediction $x^L$ and the target t. Note that some layers may not have any parameters, that is, $w^i$ may be empty for some i.

In an example of a CNN, ReLu is used as an activation function for the convolutional layers and the softmax activation function provides information in order to give a classification output. The following sections will explain the purpose of the most important layers.

An input image is input to a feature learning section of a layer comprising convolution and ReLu, followed by a layer comprising pooling, which is followed by further pairwise repetitions of layers of convolution and ReLu and of pooling. The output of the feature learning section is input to a classification section which comprises layers directed to flattening, fully connecting and softmaxing.

In a convolutional layer, multiple convolution kernels are usually used. Assuming D kernels are used and each kernel is of spatial span H×W, we denote all the kernels as f. f is an order 4 tensor in $\mathbb{R}^{H \times W \times D^l \times D}$. Similarly, we use index variables $0 \leq i < H$, $0 \leq j < W$, $0 \leq d^l < D^l$ and $0 \leq d < D$ to pinpoint a specific element in the kernels. Also note that the set of kernels f refers to the same object as the notation $w^L$ above. We change the notation a bit to simplify the derivation. It is also clear that even if the mini-batch strategy is used, the kernels remain unchanged.

The spatial extent of the output is smaller than that of the input so long as the convolution kernel is larger than 1×1. Sometimes we need the input and output images to have the same height and width, and a simple padding trick can be used.

For every channel of the input, if we pad (i.e., insert)

$$\left\lfloor \frac{H-1}{2} \right\rfloor$$

rows above the first row and $$\left\lfloor \frac{H}{2} \right\rfloor$$

rows below the last row, and pad $$\left\lfloor \frac{W-1}{2} \right\rfloor$$

columns the left of the first column and $$\left\lfloor \frac{W}{2} \right\rfloor$$

columns to the right of the last column of the input, the convolution output will be $H^l \times W_l \times D$ in size, i.e. having the same spatial extent as the input. $\lfloor * \rfloor$ is the floor function. Elements of the padded rows and columns are usually set to 0, but other values are also possible.

Stride is another important concept in convolution. A kernel is convolved with the input at every possible spatial location, which corresponds to the stride s=1. However, if s>1, every movement of the kernel skip s−1 pixel locations (i.e., the convolution is performed once every s pixel both horizontally and vertically).

In this section, we consider the simple case when the stride is 1 and no padding is used. Hence, we have y (or $x^{l+1}$) in $\mathbb{R}^{H^{l+1} \times W^{l+1} \times D^{l+1}}$, with $H^{l+1} = H^l - H + 1$, $W^{l+1} = W_l - W + 1$, and $D^{l+1} = D$. In precise mathematics, the convolution procedure can be expressed as an equation:

$$y_{i^{l+1}, j^{l+1}, d} = \Sigma_{i=0}^{H} \Sigma_{j=0}^{W} \Sigma_{d^l=0}^{D^l} f_{i,j,d^l,d} \times x_{i^{l+1}+i, j^{l+1}+j, d^l}^{l} \qquad (2)$$

Equation 2 is repeated for all $0 \leq d \leq D = D^{l+1}$, and for any spatial location ($i_{l+1}, j_{l+1}$) satisfying $0 \leq i^{l+1} < H_l - H + 1 = H^{l+1}$, $0 \leq j^{l+1} < W^l - W + 1 = W^{l+1}$. In this equation, $x_{i^{l+1}+i, j^{l+1}+j, d^l}^{l}$ refers to the element of $x^l$ indexed by the triplet ($i^{l+1}+i, j_{l+1}+j, d_l$). A bias term $b_d$ is usually added to $y_{i^{l+1}, j^{l+1}, d}$. We omit this term in this note for clearer presentation.

A pooling function replaces the output of the net at a certain location with a summary statistic of the nearby outputs. For example, a max pooling operation reports the maximum output within a rectangular neighbourhood of a table. Other popular pooling functions include the average of a rectangular neighbourhood, the $L_2$ norm of a rectangular neighbourhood, or a weighted average based on the distance from the central pixel. In all cases, pooling helps to make the representation approximately invariant to small translations of the input. Invariance to translation means that if we translate the input by a small amount, the values of the pooled outputs do not change.

Because pooling summarizes the responses over a whole neighbourhood, it is possible to use fewer pooling units than detector units, by reporting summary statistics for pooling regions spaced k pixels apart rather than one pixel apart. This improves the computational efficiency of the network because the next layer has roughly k times fewer inputs to process.

Suppose all the parameters of a CNN model $w^1, \ldots, w^{L-1}$ have been learned, then we are ready to use this model for prediction. Prediction only involves running the CNN model forward, i.e., in the direction of the arrows in equation 1. Take the image classification problem as an example. Starting from the input $x^1$, we make it pass the processing of the first layer (the box with parameters $w^1$), and get $x^2$. In turn, $x^2$ is passed into the second layer, etc. Finally, we receive $x_l \in \mathbb{R}^C$, which estimates the posterior probabilities of $x^1$ belonging to the C categories. We can output the CNN prediction as:

$$\arg\max_i x_i^L \quad (3)$$

Now, the problem is: how do we learn the model parameters?

As in many other learning systems, the parameters of a CNN model are optimized to minimize the loss z, i.e. we want the prediction of a CNN model to match the ground-truth labels. Suppose one training example $x^1$ is given for training such parameters. The training process involves running the CNN network in both directions. We first run the network in the forward pass to get $x^L$ to achieve a prediction using the current CNN parameters. Instead of outputting a prediction, we need to compare the prediction with the target t corresponding to $x^1$, i.e. continue running the forward pass till the last loss layer. Finally, we achieve a loss z. The loss z is then a supervision signal, guiding how the parameters of the model should be modified (updated).

There exist several algorithms for optimizing a loss function and CNNs are not limited to a specific one. An example algorithm is called Stochastic Gradient Descent (SGD). This means the parameters are updated by using the gradient estimated from a (usually) small subset of training examples.

$$w^i \leftarrow w^i - \eta \frac{\delta z}{\delta w^i} \quad (4)$$

In equation 4, the $\leftarrow$ sign implicitly indicates that the parameters $w^i$ (of the i-layer) are updated from time t to t+1. If a time index t is explicitly used, this equation will look like $$(w^i)^{t+1} = (w^i)^t - \eta \frac{\delta z}{\delta (w^i)^t} \quad (5)$$

In equation 4, the partial derivative $$\frac{\delta z}{\delta w^i}$$

measures the rate of increase of z with respect to the changes in different dimensions of $w^i$. This partial derivative vector is called the gradient in mathematical optimization. Hence, in a small local region around the current value of $w^i$, to move $w^i$ in the direction determined by the gradient will increase the objective value z. In order to minimize the loss function, we should update $w^i$ along the opposite direction of the gradient. This updating rule is called the gradient descent.

If we move too far in the negative gradient direction, however, the loss function may increase. Hence, in every update we only change the parameters by a small proportion of the negative gradient, controlled by η (the learning rate). η>0 is usually set to a small number (e.g., η=0.001). One update based on $x^1$ will make the loss smaller for this particular training example if the learning rate is not too large. However, it is very possible that it will make the loss of some other training examples become larger. Hence, we need to update the parameters using all training examples. When all training examples have been used to update the parameters, we say one epoch has been processed. One epoch will in general reduce the average loss on the training set until the learning system overfits the training data. Hence, we can repeat the gradient descent updating epochs and terminate at some point to obtain the CNN parameters (e.g., we can terminate when the average loss on a validation set increases).

The last layer's partial derivatives are easy to compute. Because $x^L$ is connected to z directly under the control of parameters $w^L$, it is easy to compute $$\frac{\delta z}{\delta w^L}.$$

This step is only needed when $w^L$ is not empty. In the same spirit, it is also easy to compute $$\frac{\delta z}{\delta x^L}.$$

For example, if the squared $L_2$ loss is used, we have an empty $$\frac{\delta z}{\delta w^L}, \text{ and } \frac{\delta z}{\delta x^L} = x^L - t.$$

In fact, for every layer, we compute two sets of gradients: the partial derivatives of z with respect to the layer parameters $w^i$, and that layers input $x_i$. The term $$\frac{\delta z}{\delta w^i},$$

as seen in Equation 4, can be used to update the current (i-th) layer's parameters. The term $$\frac{\delta z}{\delta x^i}$$

can be used to update parameters backwards, e.g., to the (i−1)-th layer. An intuitive explanation is: $x^i$ is the output of the (i−1)-th layer and $$\frac{\delta z}{\delta x^i}$$

is how $x^i$ should be changed to reduce the loss function. Hence, we could view $$\frac{\delta z}{\delta x^i}$$

as the part of the "error" supervision information propagated from z backward till the current layer, in a layer by layer fashion. Thus, we can continue the back propagation process, and use $$\frac{\delta z}{\delta x^i}$$

to propagate the errors backward to the (i−1)-th layer. This layer-by-layer backward updating procedure makes learning a CNN much easier.

Take the i-th layer as an example. When we update the i-th layer, the back propagation process for the (i+1)-th layer must have been finished. That is, we already computed the terms $$\frac{\delta z}{\delta w^{i+1}} \text{ and } \frac{\delta z}{\delta x^{i+1}}.$$

Both are stored in memory and ready for use. Now our task is to compute $$\frac{\delta z}{\delta w^i} \text{ and } \frac{\delta z}{\delta x^i}.$$

Using the chain rule, we have $$\frac{\partial z}{\partial (vec(w^i)^T)} = \frac{\partial z}{\partial (vec(x^{i+1})^T)} \frac{\partial vec(x^{i+1})}{\partial (vec(w^i)^T)}$$

$$\frac{\partial z}{\partial (vec(x^i)^T)} = \frac{\partial z}{\partial (vec(x^{i+1})^T)} \frac{\partial vec(x^{i+1})}{\partial (vec(x^i)^T)}$$

Since $$\frac{\partial z}{\partial x^{i+1}}$$

is already computed and stored in memory, it requires just a matrix reshaping operation (vec) and an additional transpose operation to get $$\frac{\partial z}{\partial vec(x^{i+1})},$$

which is the first term in the right hand side (RHS) of both equations. So long as we can compute $$\frac{\partial vec(x^{i+1})}{\partial (vec(w^i)^T)} \text{ and } \frac{\partial vec(x^{i+1})}{\partial (vec(x^i)^T)},$$

we can easily get what we want (the left hand side of both equations).

$$\frac{\partial vec(x^{i+1})}{\partial (vec(w^i)^T)} \text{ and } \frac{\partial vec(x^{i+1})}{\partial (vec(x^i)^T)}$$

are much easier to compute than directly computing $$\frac{\partial z}{\partial (vec(x^i)^T)} \text{ and } \frac{\partial z}{\partial (vec(w^i)^T)},$$

because $x^i$ is directly related to $x^{i+1}$, through a function with parameters $w^i$.

In the context of neural networks, activations serve as transfer functions between the input of a neuron and the output. They define under which conditions the node is activated, i.e. the input values are mapped to the output which, in hidden layers, serves again as one of the inputs to the succeeding neuron. There exists a vast amount of different activation functions with different characteristics.

A loss function quantifies how well an algorithm models the given data. To learn from the data and in order to change the weights of the network, the loss function has to be minimized. Generally, one can make the distinction between a regression loss and classification loss. Classification predicts output from set of finite categorical values (class labels), and regression, on the other hand, deals with prediction a continuous value.

In the following mathematical formulations, the following parameters are defined as:
 n is the number of training examples
 i is the i-th training example in a data set
 $y_i$ is the ground truth label for the i-th training example
 $\hat{y}_i$ is the prediction for i-th training example The most common setting for classification problems is cross-entropy loss. It increases as the predicted probability diverges from the actual label. The log of the actual predicted probability is multiplied with the ground truth class. An important aspect of this is that cross entropy loss penalizes heavily the predictions that are confident but wrong. The mathematical formulation can be described as:

$$\text{CrossEntropyLoss} = -(y_i \log(\hat{y}_i) + (1-y_i)\log(1-\hat{y}i)) \quad (6)$$

A typical example for a regression loss is the mean square error or $L_2$ loss. As the name suggests, mean square error is measured as the average of the squared difference between predictions and actual observations. It is only concerned with the average magnitude of error irrespective of their direction. However, due to squaring, predictions which are far away from actual values are penalized heavily in comparison to less deviated predictions. Plus MSE has nice mathematical properties which makes it easier to calculate gradients. Its formulation is as follows:

$$MSE = \frac{1}{n} \cdot \sum_{i=1}^{n}(y_i - \hat{y}_i)^2$$

The following documents contain information on the functioning of convolutional neural networks:
I. Goodfellow, Y. Bengio, and A. Courville, "Deep learning, chapter convolutional networks." http://www.deeplearningbook.org, 2016.
J. Wu, "Introduction to convolutional neural networks." https://pdfs.semanticscholar.org/450c/a19932fcef1ca6d0442cbf52fec38fb9d1e5.pdf. "Common loss functions in machine learning." https://towardsdatascience.com/common-loss-functions-in-machine-learning-46af0ffc4d23. Accessed: 2019 Aug. 22.
Alex Krizhevsky, Ilya Sutskever, and Geoffrey E. Hinton, "Imagenet classification with deep convolutional neural networks." http://papers.nips.cc/paper/4824-imagenet-classification-with-deep-convolutional-neural-networks.pdf.
S. Ren, K. He, R. Girshick, and J. Sun, "Faster r-cnn: Towards real-time object detection with region proposal networks." https://arxiv.org/pdf/1506.01497.pdf.
S.-E. Wei, V. Ramakrishna, T. Kanade, and Y. Sheikh, "Convolutional pose machines." https://arxiv.org/pdf/1602.00134.pdf.
Jonathan Long, Evan Shelhamer, and Trevor Darrell, "Fully convolutional networks for semantic segmentation." https://www.cv-foundation.org/openaccess/content_cvpr_2015/papers/Long_Fully_Convolutional_Networks_2015_CVPR_paper.pdf.

In a fourth aspect, the invention is directed to a program which, when running on a computer or when loaded onto a computer, causes the computer to perform the method steps of the method according to the first to third aspect, and/or a (for example, non-transitory) program storage medium on which the program is stored or a program storage medium on which data defining the model parameters and the architecture of a learning algorithm which has been trained by executing the method according to the first aspect is stored, and/or a data carrier signal carrying the aforementioned program, and/or a data carrier signal carrying data defining the model parameters and the architecture of a learning algorithm which has been trained by executing the method according to the first aspect and/or a data stream which carries the aforementioned program, and/or a data stream which carries data defining the model parameters and the architecture of a learning algorithm which has been trained by executing the method according to the first aspect, and/or at least one computer comprising at least one processor and a memory, wherein the aforementioned program is running on the at least one processor or loaded into the memory of the computer.

The invention may alternatively or additionally relate to a (physical, for example electrical, for example technically generated) signal wave, for example a digital signal wave, such as an electromagnetic carrier wave carrying information which represents the program, for example the aforementioned program, which for example comprises code means which are adapted to perform any or all of the steps of the method according to the first aspect. The signal wave is in one example a data carrier signal carrying the aforementioned computer program. A computer program stored on a disc is a data file, and when the file is read out and transmitted it becomes a data stream for example in the form of a (physical, for example electrical, for example technically generated) signal. The signal can be implemented as the signal wave, for example as the electromagnetic carrier wave which is described herein. For example, the signal, for example the signal wave is constituted to be transmitted via a computer network, for example LAN, WLAN, WAN, mobile network, for example the internet. For example, the signal, for example the signal wave, is constituted to be transmitted by optic or acoustic data transmission. The invention according to the second aspect therefore may alternatively or additionally relate to a data stream representative of the aforementioned program, i.e. comprising the program.

In a fifth aspect, the invention is directed to a system for determining whether a plurality of for example two or exactly two, medical images were taken of the same patient, the system comprising:
a) the at least one computer according to the fourth aspect;
b) at least one electronic data storage device storing the first patient image data and the second patient image data; and
c) the program storage medium according to the fourth aspect,
wherein the at least one computer is operably coupled to the at least one electronic data storage device for acquiring, from the at least one electronic data storage device, the first patient image data and the second patient image data, and for storing, in the at least one electronic data storage device, at least the patient similarity data.

In a sixth aspect, the invention is directed to a system for determining a plurality of, for example two or exactly two, medical images were taken of the same patient, the system comprising:
a) the at least one computer according to the fourth aspect;
b) at least one electronic data storage device storing the registration data; and
c) the program storage medium according to the fourth aspect,
wherein the at least one computer is operably coupled to
the at least one electronic data storage device for acquiring, from the at least one electronic data storage device, the specific registration data, and for storing, in the at least one electronic data storage device, at least the specific image similarity data; and
the program storage medium for acquiring, from the program storage medium, the data defining the model parameters and the architecture of the learning algorithm.

For example, the invention does not involve or in particular comprise or encompass an invasive step which would represent a substantial physical interference with the body requiring professional medical expertise to be carried out and entailing a substantial health risk even when carried out with the required professional care and expertise.

Definitions

In this section, definitions for specific terminology used in this disclosure are offered which also form part of the present disclosure.

The method in accordance with the invention is for example a computer implemented method. For example, all the steps or merely some of the steps (i.e. less than the total number of steps) of the method in accordance with the invention can be executed by a computer (for example, at least one computer). An embodiment of the computer implemented method is a use of the computer for performing a data processing method. An embodiment of the computer implemented method is a method concerning the operation of the computer such that the computer is operated to perform one, more or all steps of the method.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating or determining steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term computer includes a server resource. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing (medical) imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is a virtual reality device or an augmented reality device (also referred to as virtual reality glasses or augmented reality glasses) which can be used as "goggles" for navigating. A specific example of such augmented reality glasses is Google Glass (a trademark of Google, Inc.). An augmented reality device or a virtual reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. An example of such a digital lightbox is Buzz®, a product of Brainlab AG. The monitor may also be the monitor of a portable, for example handheld, device such as a smart phone or personal digital assistant or digital media player.

The invention also relates to a computer program comprising instructions which, when on the program is executed by a computer, cause the computer to carry out the method or methods, for example, the steps of the method or methods, described herein and/or to a computer-readable storage medium (for example, a non-transitory computer-readable storage medium) on which the program is stored and/or to a computer comprising said program storage medium and/or to a (physical, for example electrical, for example technically generated) signal wave, for example a digital signal wave, such as an electromagnetic carrier wave carrying information which represents the program, for example the aforementioned program, which for example comprises code means which are adapted to perform any or all of the method steps described herein. The signal wave is in one example a data carrier signal carrying the aforementioned computer program. The invention also relates to a computer comprising at least one processor and/or the aforementioned computer-readable storage medium and for example a memory, wherein the program is executed by the processor.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

The expression "acquiring data" for example encompasses (within the framework of a computer implemented method) the scenario in which the data are determined by the computer implemented method or program. Determining data for example encompasses measuring physical quantities and transforming the measured values into data, for example digital data, and/or computing (and e.g. outputting) the data by means of a computer and for example within the framework of the method in accordance with the invention. A step of "determining" as described herein for example comprises or consists of issuing a command to perform the determination described herein. For example, the step comprises or consists of issuing a command to cause a computer, for example a remote computer, for example a remote server, for example in the cloud, to perform the determination. Alternatively or additionally, a step of "determination" as described herein for example comprises or consists of receiving the data resulting from the determination described herein, for example receiving the resulting data from the remote computer, for example from that remote computer which has been caused to perform the determination. The meaning of "acquiring data" also for example encompasses the scenario in which the data are received or retrieved by (e.g. input to) the computer implemented method or program, for example from another program, a previous method step or a data storage medium, for example for further processing by the computer implemented method or program. Generation of the data to be acquired may but need not be part of the method in accordance with the invention. The expression "acquiring data" can therefore also for example mean waiting to receive data and/or receiving the data. The received data can for example be inputted via an interface. The expression "acquiring data" can also mean that the computer implemented method or program performs steps in order to (actively) receive or retrieve the data from a data source, for instance a data storage medium (such as for example a ROM, RAM, database, hard drive, etc.), or via the interface (for instance, from another computer or a network). The data acquired by the disclosed method or device, respectively, may be acquired from a database located in a data storage device which is operably to a computer for data transfer between the database and the computer, for example from the database to the computer. The computer acquires the data for use as an input for steps of determining data. The determined data can be output again to the same or another database to be stored for later use. The database or database used for implementing the disclosed method can be located on network data storage device or a network server (for example, a cloud data storage device or a cloud server) or a local data storage device (such as a mass storage device operably connected to at least one computer executing the disclosed method). The data can be made "ready for use" by performing an additional step before the acquiring step. In accordance with this additional step, the data are generated in order to be acquired. The data are for example detected or captured (for example by an analytical device). Alternatively or additionally, the data are inputted in accordance with the additional step, for instance via interfaces. The data generated can for example be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, for example determining data, does not involve a surgical step and in particular does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like.

It is the function of a marker to be detected by a marker detection device (for example, a camera or an ultrasound receiver or analytical devices such as CT or MRI devices) in such a way that its spatial position (i.e. its spatial location and/or alignment) can be ascertained. The detection device is for example part of a navigation system. The markers can be active markers. An active marker can for example emit electromagnetic radiation and/or waves which can be in the infrared, visible and/or ultraviolet spectral range. A marker can also however be passive, i.e. can for example reflect electromagnetic radiation in the infrared, visible and/or ultraviolet spectral range or can block x-ray radiation. To this end, the marker can be provided with a surface which has corresponding reflective properties or can be made of metal in order to block the x-ray radiation. It is also possible for a marker to reflect and/or emit electromagnetic radiation and/or waves in the radio frequency range or at ultrasound wavelengths. A marker preferably has a spherical and/or spheroid shape and can therefore be referred to as a marker sphere; markers can however also exhibit a cornered, for example cubic, shape.

A marker device can for example be a reference star or a pointer or a single marker or a plurality of (individual) markers which are then preferably in a predetermined spatial relationship. A marker device comprises one, two, three or more markers, wherein two or more such markers are in a predetermined spatial relationship. This predetermined spatial relationship is for example known to a navigation system and is for example stored in a computer of the navigation system.

In another embodiment, a marker device comprises an optical pattern, for example on a two-dimensional surface. The optical pattern might comprise a plurality of geometric shapes like circles, rectangles and/or triangles. The optical pattern can be identified in an image captured by a camera, and the position of the marker device relative to the camera can be determined from the size of the pattern in the image, the orientation of the pattern in the image and the distortion of the pattern in the image. This allows determining the relative position in up to three rotational dimensions and up to three translational dimensions from a single two-dimensional image.

The position of a marker device can be ascertained, for example by a medical navigation system. If the marker device is attached to an object, such as a bone or a medical instrument, the position of the object can be determined from the position of the marker device and the relative position between the marker device and the object. Determining this relative position is also referred to as registering the marker device and the object. The marker device or the object can be tracked, which means that the position of the marker device or the object is ascertained twice or more over time.

Preferably, atlas data is acquired which describes (for example defines, more particularly represents and/or is) a general three-dimensional shape of the anatomical body part. The atlas data therefore represents an atlas of the anatomical body part. An atlas typically consists of a plurality of generic models of objects, wherein the generic models of the objects together form a complex structure. For example, the atlas constitutes a statistical model of a patient's body (for example, a part of the body) which has been generated from anatomic information gathered from a plurality of human bodies, for example from medical image data containing images of such human bodies. In principle, the atlas data therefore represents the result of a statistical analysis of such medical image data for a plurality of human bodies. This result can be output as an image—the atlas data therefore contains or is comparable to medical image data. Such a comparison can be carried out for example by applying an image fusion algorithm which conducts an image fusion between the atlas data and the medical image data. The result of the comparison can be a measure of similarity between the atlas data and the medical image data. The atlas data comprises image information (for example, positional image information) which can be matched (for example by applying an elastic or rigid image fusion algorithm) for example to image information (for example, positional image information) contained in medical image data so as to for example compare the atlas data to the medical image data in order to determine the position of anatomical structures in the medical image data which correspond to anatomical structures defined by the atlas data.

The human bodies, the anatomy of which serves as an input for generating the atlas data, advantageously share a common feature such as at least one of gender, age, ethnicity, body measurements (e.g. size and/or mass) and pathologic state. The anatomic information describes for example the anatomy of the human bodies and is extracted for example from medical image information about the human bodies. The atlas of a femur, for example, can comprise the head, the neck, the body, the greater trochanter, the lesser trochanter and the lower extremity as objects which together make up the complete structure. The atlas of a brain, for example, can comprise the telencephalon, the cerebellum, the diencephalon, the pons, the mesencephalon and the medulla as the objects which together make up the complex structure. One application of such an atlas is in the segmentation of medical images, in which the atlas is matched to medical image data, and the image data are compared with the matched atlas in order to assign a point (a pixel or voxel) of the image data to an object of the matched atlas, thereby segmenting the image data into objects.

For example, the atlas data includes information of the anatomical body part. This information is for example at least one of patient-specific, non-patient-specific, indication-specific or non-indication-specific. The atlas data therefore describes for example at least one of a patient-specific, non-patient-specific, indication-specific or non-indication-specific atlas. For example, the atlas data includes movement information indicating a degree of freedom of movement of the anatomical body part with respect to a given reference (e.g. another anatomical body part). For example, the atlas is a multimodal atlas which defines atlas information for a plurality of (i.e. at least two) imaging modalities and contains a mapping between the atlas information in different imaging modalities (for example, a mapping between all of the modalities) so that the atlas can be used for transforming medical image information from its image depiction in a first imaging modality into its image depiction in a second imaging modality which is different from the first imaging modality or to compare (for example, match or register) images of different imaging modality with one another.

In the field of medicine, imaging methods (also called imaging modalities and/or medical imaging modalities) are used to generate image data (for example, two-dimensional or three-dimensional image data) of anatomical structures (such as soft tissues, bones, organs, etc.) of the human body. The term "medical imaging methods" is understood to mean (advantageously apparatus-based) imaging methods (for example so-called medical imaging modalities and/or radiological imaging methods) such as for instance computed tomography (CT) and cone beam computed tomography (CBCT, such as volumetric CBCT), x-ray tomography, magnetic resonance tomography (MRT or MRI), conventional x-ray, sonography and/or ultrasound examinations, and positron emission tomography. For example, the medical imaging methods are performed by the analytical devices. Examples for medical imaging modalities applied by medical imaging methods are: X-ray radiography, magnetic resonance imaging, medical ultrasonography or ultrasound, endoscopy, elastography, tactile imaging, thermography, medical photography and nuclear medicine functional imaging techniques as positron emission tomography (PET) and Single-photon emission computed tomography (SPECT). The image data thus generated is also termed "medical imaging data". Analytical devices for example are used to generate the image data in apparatus-based imaging methods. The imaging methods are for example used for medical diagnostics, to analyse the anatomical body in order to generate images which are described by the image data. The imaging methods are also for example used to detect pathological changes in the human body. However, some of the changes in the anatomical structure, such as the pathological changes in the structures (tissue), may not be detectable and for example may not be visible in the images generated by the imaging methods. A tumour represents an example of a change in an anatomical structure. If the tumour grows, it may then be said to represent an expanded anatomical structure. This expanded anatomical structure may not be detectable; for example, only a part of the expanded anatomical structure may be detectable. Primary/high-grade brain tumours are for example usually visible on MRI scans when contrast agents are used to infiltrate the tumour. MRI scans represent an example of an imaging method. In the case of MRI scans of such brain tumours, the signal enhancement in the MRI images (due to the contrast agents infiltrating the tumour) is considered to represent the solid tumour mass. Thus, the tumour is detectable and for example discernible in the image generated by the imaging method. In addition to these tumours, referred to as "enhancing" tumours, it is thought that approximately 10% of brain tumours are not discernible on a scan and are for example not visible to a user looking at the images generated by the imaging method.

BRIEF DESCRIPTION OF THE DRAWINGS

In the following, the invention is described with reference to the appended figures which give background explanations and represent specific embodiments of the invention. The scope of the invention is however not limited to the specific features disclosed in the context of the figures, wherein.

DESCRIPTION OF EMBODIMENTS

Figure 1:
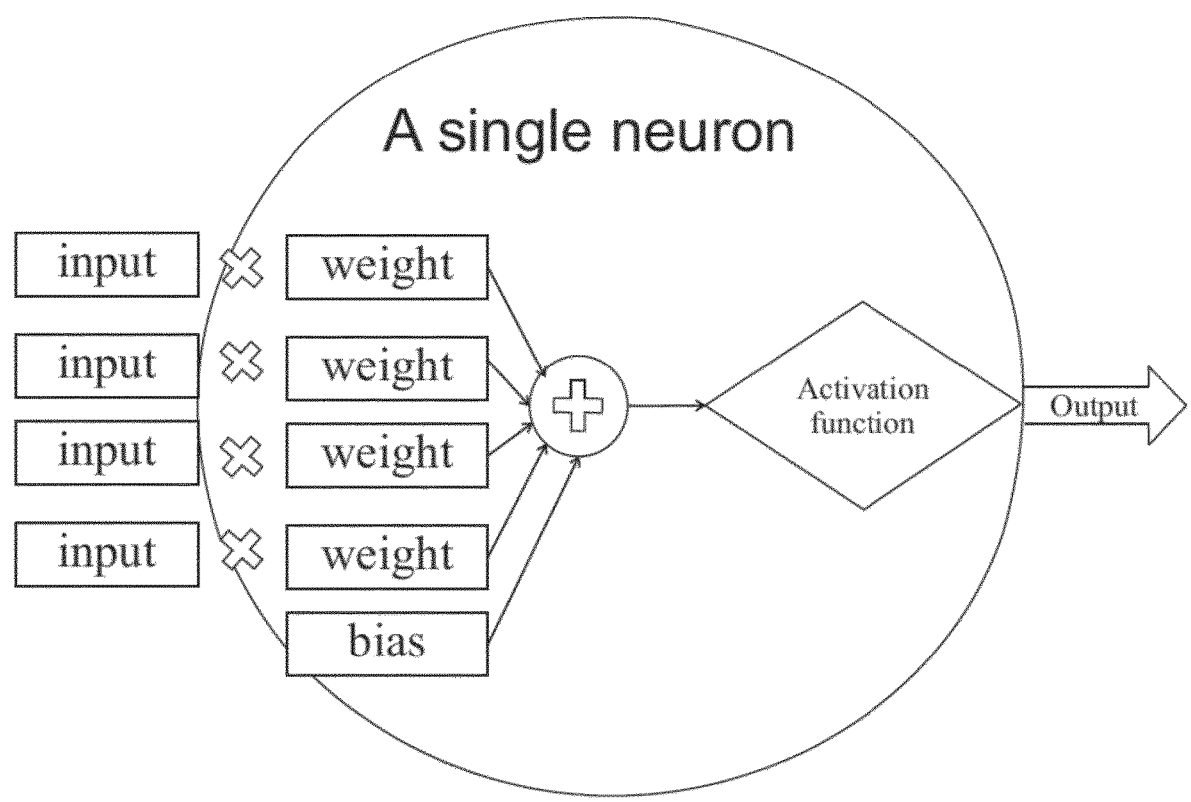
FIG. 1 illustrates a neuron of a neural network.

FIG. 1 illustrates the structure of a neuron as part of a neural network, for example a convolutional neural network, in which input is assigned certain weights for processing by an activation function which generates the output of the neuron.

Figure 2:
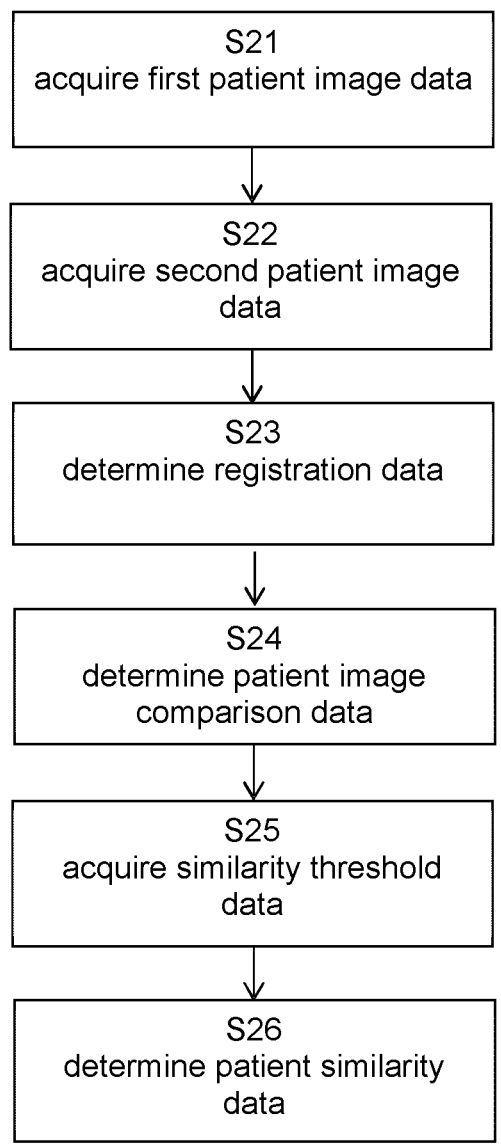
FIG. 2 shows a basic flow of the method according to the first aspect.

FIG. 2 describes the basic flow of the method according to the first aspect, which starts in step S21 with acquiring the first patient image data, continues to step S22 which encompasses acquisition of the second patient image data, and then proceeds to determining the registration data in step S23. On that basis, step S24 calculates the patient image comparison data, which is followed by acquisition of the similarity threshold data in step S25. Finally, the patient similarity data is determined in step S26.

Figure 3:
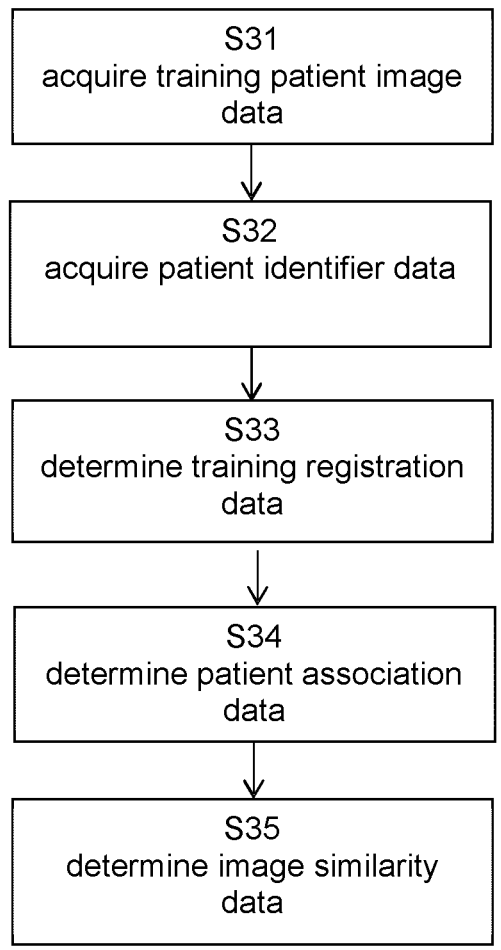
FIG. 3 shows a basic flow of the method according to the second aspect.

FIG. 3 illustrates the basic steps of the method according to the third aspect, in which step S31 encompasses acquisition of the training patient image data and step 32 acquires the patient identifier data. Subsequent step 33 determines the training registration data, followed by determination of the patient association data in step S34. The image similarity data is then determined in step S35.

Figure 4:
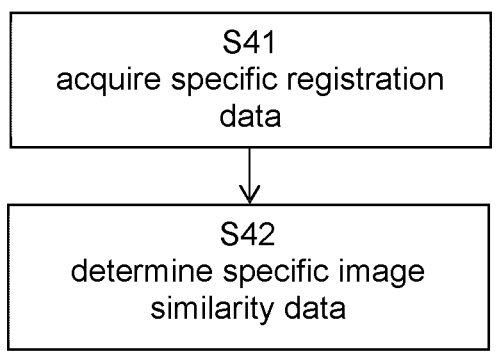
FIG. 4 shows a basic flow of the method according to the third aspect.

FIG. 4 illustrates the basic steps of the method according to the second aspect, in which step S41 encompasses acquisition of the specific registration data and step 42 determines the specific image similarity data.

Figure 5A:
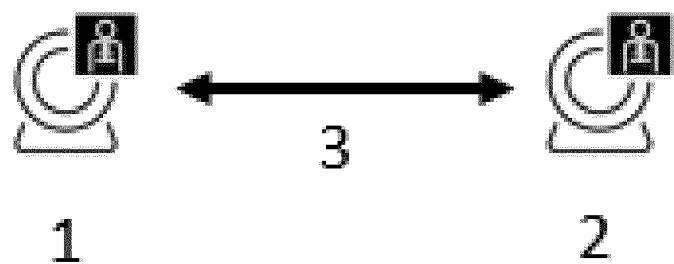
FIGS. 5a to 5e shows an application of the method according to the first to third aspect.
Figure 5B:
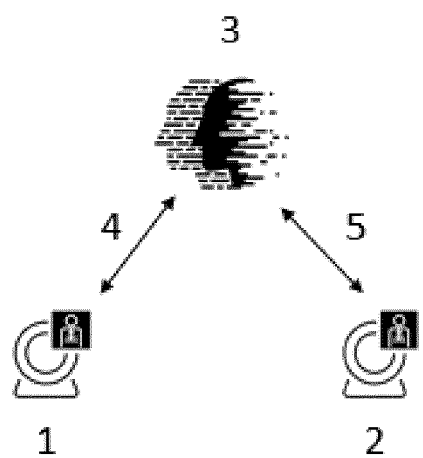
Figure 5C:
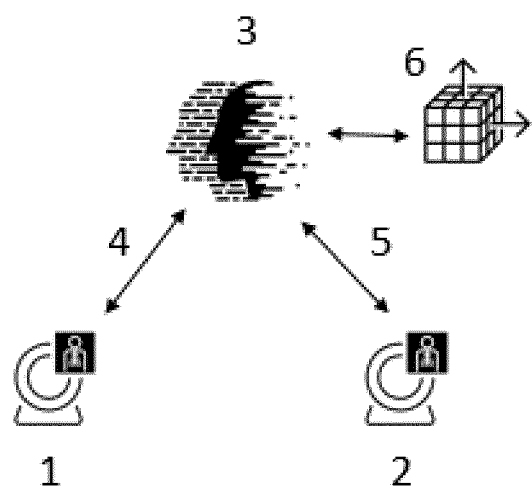
Figure 5D:
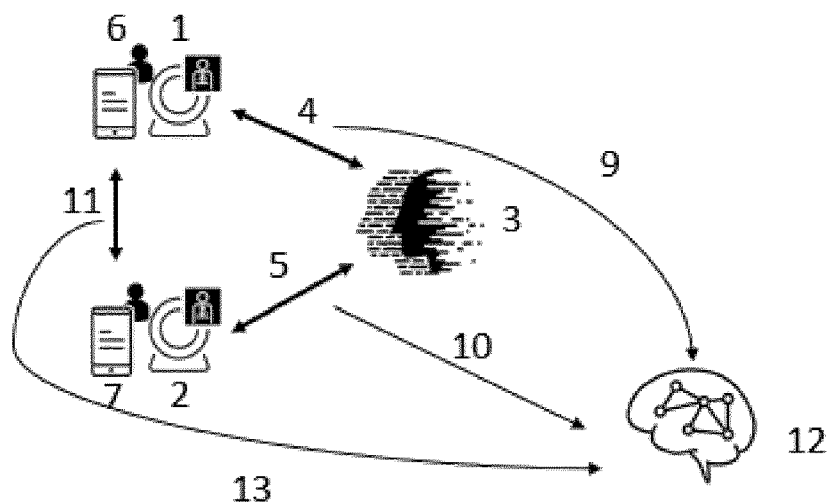
Figure 5E:
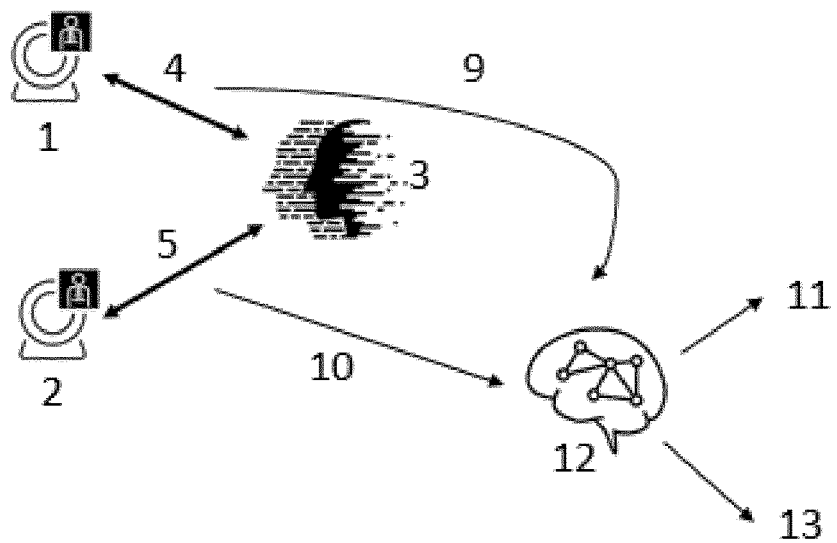

FIG. 5a shows how a first patient image 1 corresponding to a first medical image and a second patient image 2 corresponding to a second medical image are directly registered via a registration 3. FIG. 5b illustrates an indirect registration of the first patient image 1 with the second patient image 2 which are both registered to an atlas 3 via first registration 4 and a second registration 5. According to FIG. 5c and in addition to the features shown in FIG. 5b, the atlas 3 applies an adaptability model 6 to the first registration 4 and the second registration 5 to determine whether any difference between the registration 4, 5 is due to anatomic adaptation or adaptability, respectively. FIG. 5d shows that a first patient image 1 is registered to an atlas 3 via a first registration 4. A second patient image 2 is registered to the same atlas 3 via a second registration 5. Patient identity information 6 of the patient associated with the first patient image 1 and patient identify information 7 of the patient associated with the second patient image 2 is compared 11 to determine whether the patient associated with the first patient image 1 is identical to the patient associated with the second patient image 2 or not. The registration 4 is input 9 into a machine learning algorithm 12. The registration 5 is input 10 into a machine learning algorithm 12. Also, the information describing whether the two patients and/or the first patient image 1 and the second patient image 2 are identical or not 11 is input 13 into the machine learning algorithm. On the basis of that input, the machine learning algorithm is trained as explained with regard to the second aspect of this disclosure. FIG. 5e illustrates use of the trained machine learning algorithm 12: a first patient image 1 is registered to an atlas 3 via a first registration 4, and a second patient image 2 is registered to the same atlas 3 via a second registration 5. The first registration 4 is input 9 into the trained machine learning algorithm 12. The second registration 5 is also input 10 into the trained machine learning algorithm 12. The machine learning algorithm determines whether the first patient image 1 and the second patient image 2 are from the same patient 11 or from different patients 13 and outputs corresponding information.

Figure 6:
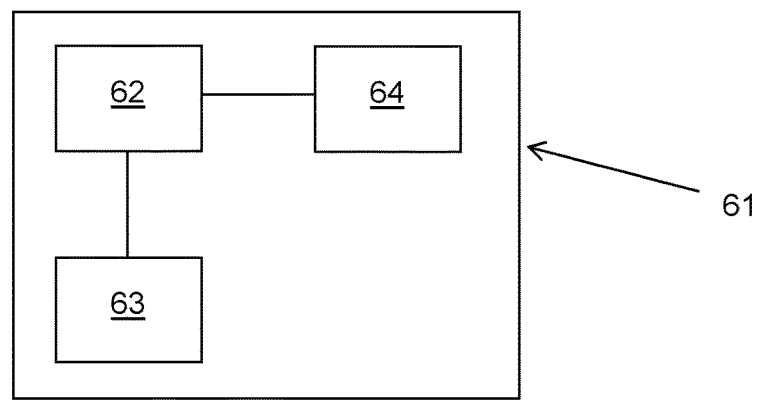
FIG. 6 is a schematic illustration of the system according to the fifth aspect.

FIG. 6 is a schematic illustration of the medical system 61 according to the fifth aspect. The system is in its entirety identified by reference sign 61 and comprises a computer 62, an electronic data storage device (such as a hard disc) 64 for storing at least the data stored by the system according to the fifth aspect, and a program storage medium 63 storing the program according to the fourth aspect. The components of the medical system 1 have the functionalities and properties explained above with regard to the fifth and sixth aspects of this disclosure.

The following embodiments form part of the invention:
A. A computer-implemented method of determining whether a plurality of medical images were taken of the same patient, the method comprising the following steps:
  a) first patient image data is acquired (S21) which describes a first medical image of a first anatomical body part of a first patient;
  b) second patient image data is acquired (S22) which describes a second medical image of a second anatomical body part of a second patient corresponding to the first anatomical body part;
  c) registration data is determined (S23) based on the first patient image data and the second patient image data, wherein the registration data describes a registration between the first medical image and the second medical image;
  d) patient image comparison data is determined (S24) based on the registration data, wherein the patient image comparison data describes a measure of similarity between the first medical image and the second medical image;

e) similarity threshold data is acquired (S25) which describes a threshold for the measure of similarity; and f) patient similarity data is determined (S26) based on the patient image comparison data, wherein the patient similarity data describes that the first medical image and the second medical image were taken of the same patient if the measure of similarity attains a predetermined relationship relative to the threshold.

B. The method according to embodiment A, comprising a step in which statistical threshold data is acquired which describes a threshold for a statistical value describing a statistical quantity characterising the registration, wherein the measure of similarity is determined by determining whether the statistical value attains a predetermined relationship relative to the threshold, wherein it is determined that the first medical image and the second medical are similar if the statistical value attains a predetermined relationship relative to the threshold.

C. The method according to any one of embodiments A to B, comprising a step in which registration analysis data is determined based on the registration data, wherein the registration analysis data describes a statistical value characterising a set of registration vectors for at least one anatomically invariant or anatomically adaptable part of the first and second anatomical body parts, wherein the patient image comparison data is determined based on the registration analysis data.

D. The method according to embodiment C, comprising a step in which atlas data is acquired which describes an image-based model of the first and second anatomical body parts, wherein determining the registration data includes
determining first registration data based on the first patient image data and the atlas data, wherein the first registration data describes a first registration between the first medical image and the image-based model; and determining second registration data based on the second patient image data and the atlas data, wherein the second registration data describes a second registration between the second medical image and the image-based model, wherein the registration analysis data is determined for each of the first registration and the second registration data separately, wherein determining the patient image comparison data includes determining registration comparison data based on the first registration data and the second registration data, wherein the registration comparison data describes a measure of similarity between the first registration and the second registration, wherein the patient image comparison data is determined further based on the registration comparison data by comparing the statistical value for the first registration with the statistical value of the second registration.

E. The method according to embodiment C, comprising a step in which atlas data is acquired which describes an image-based model of the first and second anatomical body parts, wherein determining the registration data includes
determining first registration data based on the first patient image data and the atlas data, wherein the first registration data describes a first registration between the first medical image and the image-based model; and determining second registration data based on the second patient image data and the atlas data, wherein the second registration data describes a second registration between the second medical image and the image-based model, wherein determining the patient image comparison data includes determining registration comparison data based on the first registration data and the second registration data, wherein the registration comparison data describes a measure of similarity between the first registration and the second registration, wherein determining the registration comparison data comprises determining the inverse of the second registration and multiplying it with the first registration, and if the multiplication results in at least substantially unity in the anatomically invariant region, determining that the first registration and the second registration are similar.

F. The method according to embodiment D or E, comprising a step in which biomechanical model data is acquired which describes a biomechanical model of the first and second anatomical body part;

wherein determining the registration comparison data comprises determining registration difference data describing a difference between the first registration and the second registration, wherein the difference is determined by determining the inverse of the second registration and multiplying it with the first registration, and wherein the result of the multiplication is not at least substantially unity, wherein the at least one part of the first and second anatomical body part is anatomically adaptable, and wherein adaptability data is determined based on the biomechanical model data and the registration difference data, wherein the adaptability data describes an adaptability, for example a deformability, of the biomechanical model according to the difference between the first registration and the second registration, and wherein it is determined that the first registration and the second registration are similar if the adaptability data describes that the biomechanical model is adaptable according to the difference between the first registration and the second registration.

G. The method according to embodiment A, comprising a step in which atlas data is acquired which describes an image-based model of the first and second anatomical body parts, wherein determining the registration data includes
determining first registration data based on the first patient image data and the atlas data, wherein the first registration data describes a first registration between the first medical image and the image-based model; and determining second registration data based on the second patient image data and the atlas data, wherein the second registration data describes a second registration between the second medical image and the image-based model, wherein determining the patient image comparison data includes
  determining registration comparison data based on the first registration data and the second registration data, wherein the registration comparison data describes a measure of similarity between the first registration and the second registration,
  wherein the patient image comparison data is determined further based on the registration comparison data.

H. A computer-implemented method of training a learning algorithm to determine whether a plurality of medical images were taken of the same patient, the method comprising the following steps:
  a) training patient image data is acquired (S31) which describes a plurality of medical patient training images showing the anatomical body part;
  b) patient identifier data is acquired (S32) which describes, for each of the medical patient training images, a patient identifier identifying the patient of whom the respective medical patient image was taken;
  c) training registration data is determined (S33) based on the training patient image data, wherein the training registration data describes registrations between pairs of images from the plurality of medical patient training images;
  d) patient association data is determined (S34) for images belonging to the plurality of medical training images, wherein the patient association data is determined based on the training patient image data and the patient identifier data and comprises patient association information which describes whether the images belonging to each of the pairs of the medical images were taken of the same patient; and
  e) image similarity data is determined (S35) which describes model parameters of a learning algorithm for establishing a relation between the registrations and the patient association information, wherein the image similarity data is determined by inputting the training registration data and the patient association data into a function which establishes the relation.

I. The method according to embodiment H, wherein the registrations are established directly between plurality of medical patient training images.

J. The method according to claim 8, comprising the following steps:
  atlas data is acquired which describes an image-based model of the first and second anatomical body parts,
  first registration data is determined based on a first image of each of the pairs of medical patient training images, wherein the first registration data describes a first registration between the first image and the image-based model;
  second registration data is determined based on a second image of each of pairs of medical patient training images, wherein the second registration data describes a second registration between the second image and the image-based model,
  wherein the learning algorithm is trained to determine a statement indicating whether the first image and the second image have been taken of the same patient based on the first registration data and the second registration data, wherein the statement can be associated with a certain level of confidence.

K. The method according to embodiment J, wherein the anatomical body part is anatomically invariant or anatomically adaptable, the method comprising the following steps:
  registration analysis data is determined for each of the first registration and the second registration separately based on the registration data, wherein the registration analysis data describes a statistical value characterising a set of registration vectors for at least one anatomically invariant part of the first and second anatomical body parts,
  wherein the learning algorithm is trained to determine a statement indicating whether the first image and the second image have been taken of the same patient based on the first registration data and the second registration data, wherein the statement can be associated with a certain level of confidence.

L. The method according to embodiment H, comprising the following steps:
  atlas data is acquired which describes an image-based model of the first and second anatomical body parts,
  first registration data is determined based on a first image of each of pairs of medical patient training images, wherein the first registration data describes a first registration between the first image and the image-based model;
  second registration data is determined based on a second image of each of pairs of medical patient training images, wherein the second registration data describes a second registration between the second image and the image-based model,
  wherein the learning algorithm is trained to determine a statement indicating whether the first image and the second image have been taken of the same patient based on the first registration data and the second registration data, wherein the statement can be associated with a certain level of confidence.

M. The method according to the embodiment L, wherein the learning algorithm is trained to determine that the first image and the second image have been taken of the same patient if the multiplication results in at least substantially unity.

N. A computer-implemented method of determining whether a plurality of medical images were taken of the same patient, the method comprising the following steps:
  a) specific registration data is acquired (S41) which describes a specific registration between a plurality of medical images of an anatomical body part; and
  b) specific image similarity data is determined (S42) which describes a relation between patient association data which describes whether images belonging to the plurality of medical images were taken of the same patient and the specific registration data, wherein the specific image similarity data is determined by inputting the specific registration data into a function which establishes the relation, the function being part of a learning algorithm which has been trained by executing the method according to any one of the embodiments hereof.

O. The method according to any one of embodiments H to N, wherein the learning algorithm comprises or consists of a machine learning algorithm.

P The method according to any one of embodiments H to O, wherein the learning algorithm comprises or consists of a convolutional neural network.

Q. The method according to any one of embodiments H to P, wherein the model parameters define the learnable parameters, for example weights, of the learning algorithm.

R. A program which, when running on a computer (62) or when loaded onto a computer (62), causes the computer (62) to perform the method steps of the method according to any one of the preceding claims, and/or a program storage medium (63) on which the program is stored or a program storage medium (63) on which data defining the model parameters and the architecture of a learning algorithm which has been trained by executing the method according to any one of embodiments H to M or O to Q as far as dependent on any one of embodiments H to M is stored, and/or a data carrier signal carrying the aforementioned program, and/or a data carrier signal carrying data defining the model parameters and the architecture of a learning algorithm which has been trained by executing the method according to any one of embodiments H to M or O to Q as far as dependent on any one of embodiments H to M, and/or a data stream which carries the aforementioned program, and/or a data stream which carries data defining the model parameters and the architecture of a learning algorithm which has been trained by executing the method according to any one of embodiments H to M or O to Q as far as dependent on any one of embodiments H to M, and/or at least one computer (62) comprising at least one processor and a memory, wherein the aforementioned program is running on the at least one processor or loaded into the memory of the computer (62).

S. A system (61) for determining whether a plurality of medical images were taken of the same patient, the system (61) comprising:
  a) the at least one computer (62) according to embodiment R as far as dependent on any one of embodiments A to G;
  b) at least one electronic data storage device (64) storing the first patient image data and the second patient image data; and
  c) the program storage medium (63) according to embodiment R as far as dependent on any one of embodiments A to G,
    wherein the at least one computer (62) is operably coupled to the at least one electronic data storage device (64) for acquiring, from the at least one electronic data storage device (64), the first patient image data and the second patient image data, and for storing, in the at least one electronic data storage device (64), at least the patient similarity data.

T. A system (61) for determining a plurality of medical images were taken of the same patient, the system (61) comprising:
  a) the at least one computer (62) according to embodiments hereof;
  b) at least one electronic data storage device (64) storing the registration data; and
  c) the program storage medium (63) according to embodiments hereof,
    wherein the at least one computer (62) is operably coupled to
    the at least one electronic data storage device (64) for acquiring, from the at least one electronic data storage device (64), the specific registration data, and for storing, in the at least one electronic data storage device (64), at least the specific image similarity data; and
    the program storage medium (64) for acquiring, from the program storage medium (63), the data defining the model parameters and the architecture of the learning algorithm.

The invention claimed is:

1. A computer-implemented method of determining whether a plurality of medical images were taken of the same patient comprising:
  acquiring first patient image data describing a first medical image of a first anatomical body part of a first patient;
  acquiring second patient image data describing a second medical image of a second anatomical body part of a second patient corresponding to the first anatomical body part;
  describing registration data based on the first patient image data and the second patient image data, wherein the registration data describes a registration between the first medical image and the second medical image;
  determining patient image comparison data based on the registration data, wherein the patient image comparison data describes a measure of similarity between the first medical image and the second medical image;
  acquiring similarity threshold data describing a threshold for the measure of similarity;
  determining patient similarity data based on the patient image comparison data, wherein the patient similarity data describes that the first medical image and the second medical image were taken of the same patient if the measure of similarity attains a predetermined relationship relative to the threshold;
  acquiring atlas data describing model of the first and second anatomical body parts,
  wherein determining the registration data includes
  determining first registration data based on the first patient image data and the atlas data, wherein the first registration data describes a first registration between the first medical image and the model; and
  determining second registration data based on the second patient image data and the atlas data, wherein the second registration data describes a second registration between the second medical image and the model,
  determining registration comparison data based on the first registration data and the second registration data, wherein the registration comparison data describes a measure of similarity between the first registration and the second registration, wherein the patient image comparison data is determined based on the registration comparison data.

2. The computer implemented method of claim 1, wherein determining the registration comparison data further comprises:
  acquiring adaptability model data which describes an adaptability model of the first and second anatomical body part,
  wherein determining the registration comparison data comprises determining registration difference data describing a difference between the first registration and the second registration,
  wherein the difference is determined by determining the inverse of the second registration and concatenating it with the first registration,
  wherein the first registration and the second registration are each defined as a field of displacement vectors and wherein the difference between a result of the concatenation and an adaptability transformation results in a field of displacement vectors, the adaptability transformation describing a configuration of the adaptability model.

3. The computer implemented method of claim 1, wherein determining the registration comparison data further comprises:
   determining registration difference data describing a difference between the first registration and the second registration,
   wherein the difference is determined by determining the inverse of the second registration and concatenating it with the first registration,
   wherein the first registration and the second registration are each defined as a field of displacement vectors.

4. The computer implemented method of claim 1, wherein determining the registration comparison data further comprises:
   determining registration difference data describing a difference between the first registration and the second registration,
   wherein the difference is determined by determining the inverse of the second registration and concatenating it with the first registration,
   wherein the first registration and the second registration are each defined as a field of displacement vectors, and subtracting from the concatenation a rigid transformation, wherein the rigid transformation describes a rotation and/or a translation.

5. The computer implemented method of claim 2, wherein the first anatomical body part is an anatomically invariant or anatomically adaptable anatomical body part.

6. A computer implemented method of training a learning algorithm to determine whether a plurality of medical images were taken of the same patient, the method comprising:
   acquiring training patient image data which describes a plurality of medical patient training images showing an anatomical body part;
   acquiring patient identifier data which describes, for each of the medical patient training images, a patient identifier identifying the patient of whom the respective medical patient image was taken;
   determining training registration data based on the training patient image data, wherein the training registration data describes registrations between pairs of images from the plurality of medical patient training images;
   determining patient association data for images belonging to the plurality of medical training images, wherein the patient association data is determined based on the training patient image data and the patient identifier data and comprises patient association information which describes whether the images belonging to each of the pairs of the medical images were taken of the same patient; and
   determining image similarity data which describes model parameters of a machine learning algorithm for establishing a relation between the registrations and the patient association information, wherein the image similarity data is determined by inputting the training registration data and the patient association data into a function which establishes the relation.

7. The computer implemented method according to claim 6, further comprising:
   acquiring atlas data describing a model of the first and second anatomical body parts,
   determining first registration data based on a first image of each of the pairs of medical patient training images, wherein the first registration data describes a first registration between the first image and the model;
   determining second registration data based on a second image of each of the pairs of medical patient training images, wherein the second registration data describes a second registration between the second image and the model,
   wherein the machine learning algorithm is trained to determine a statement indicating whether the first image and the second image have been taken of the same patient based on the first registration data and the second registration data, wherein the statement can be associated with a certain level of confidence.

8. The method according to claim 6, wherein the anatomical body part is anatomically invariant or anatomically adaptable, and further comprising:
   determining registration analysis data for each of a first registration and
   a second registration separately based on the registration data, wherein the registration analysis data describes a statistical value characterising a set of registration vectors for at least one anatomically invariant part of the first and second anatomical body parts,
   wherein the learning algorithm is trained to determine a statement indicating whether the first image and the second image have been taken of the same patient based on the first registration data and the second registration data, wherein the statement can be associated with a certain level of confidence.

9. A computer-implemented method of determining whether a plurality of medical images were taken of the same patient, comprising:
   acquiring specific registration data describing a specific registration between a plurality of medical images of an anatomical body part; and
   determining specific image similarity data describing a relation between patient association data which describes whether images belonging to the plurality of medical images were taken of the same patient and the specific registration data, wherein the specific image similarity data is determined by inputting the specific registration data into a function which establishes the relation, the function being part of a trained learning algorithm;
   wherein the trained learning algorithm has been trained by:
      acquiring training patient image data which describes a plurality of medical patient training images showing the anatomical body part;
      acquiring patient identifier data which describes, for each of the medical patient training images, a patient identifier identifying the patient of whom the respective medical patient image was taken;
      determining training registration data based on the training patient image data, wherein the training registration data describes registrations between pairs of images from the plurality of medical patient training images;
      determining patient association data for images belonging to the plurality of medical training images, wherein the patient association data is determined based on the training patient image data and the patient identifier data and comprises patient association information which describes whether the images belonging to each of the pairs of the medical images were taken of the same patient; and determining image similarity data which describes model parameters of a learning algorithm for establishing a relation between the registrations and the patient association information, wherein the image similarity data is determined by inputting the training registration data and the patient association data into a function which establishes the relation.

10. A system for determining whether a plurality of medical images were taken of the same patient, comprising:

at least one computer having at least one processor and associated memory;

at least one electronic data storage device storing the first patient image data and the second patient image data;

wherein the at least one computer is operably coupled to the at least one electronic data storage device for acquiring, from the at least one electronic data storage device, first patient image data and second patient image data, and for storing, in the at least one electronic data storage device, at least patient similarity data;

wherein the associated memory includes a set of program instructions which, when executed by the at least one processor, causes the at least one processor to:

acquire the first patient image data describing a first medical image of a first anatomical body part of a first patient;

acquire the second patient image data describing a second medical image of a second anatomical body part of a second patient corresponding to the first anatomical body part;

determine registration data based on the first patient image data and the second patient image data, wherein the registration data describes a registration between the first medical image and the second medical image;

determine patient image comparison data based on the registration data, wherein the patient image comparison data describes a measure of similarity between the first medical image and the second medical image;

acquire similarity threshold data describing a threshold for the measure of similarity;

determine the patient similarity data based on the patient image comparison data, wherein the patient similarity data describes that the first medical image and the second medical image were taken of the same patient if the measure of similarity attains a predetermined relationship relative to the threshold;

acquire atlas data describing a model of the first and second anatomical body parts, wherein determining the registration data includes causing the at least one processor to further:

determine first registration data based on the first patient image data and the atlas data, wherein the first registration data describes a first registration between the first medical image and the model; and determine second registration data based on the second patient image data and the atlas data, wherein the second registration data describes a second registration between the second medical image and the model, determine registration comparison data based on the first registration data and the second registration data, wherein the registration comparison data describes a measure of similarity between the first registration and the second registration, wherein the patient image comparison data is determined based on the registration comparison data.

* * * * *